(12) United States Patent
Charrier et al.

(10) Patent No.: US 12,332,275 B2
(45) Date of Patent: Jun. 17, 2025

(54) USE OF SCANNING ELECTROCHEMICAL MICROSCOPY AS A PREDICTIVE TECHNIQUE IN A SALT FOG CORROSION TEST

(71) Applicants: COMMISSARIAT À L'ENERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: Gaëlle Charrier, Gif-sur-Yvette (FR); Aurélien Doublet, Gif-sur-Yvette (FR); Guy Deniau, Gif-sur-Yvette (FR); Renaud Cornut, Gif-sur-Yvette (FR)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 105 days.

(21) Appl. No.: 17/905,774

(22) PCT Filed: Mar. 12, 2021

(86) PCT No.: PCT/FR2021/050422
§ 371 (c)(1),
(2) Date: Sep. 7, 2022

(87) PCT Pub. No.: WO2021/181053
PCT Pub. Date: Sep. 16, 2021

(65) Prior Publication Data
US 2024/0210444 A1    Jun. 27, 2024

(30) Foreign Application Priority Data
Mar. 12, 2020   (FR) .................................. 2002450

(51) Int. Cl.
*G01Q 60/60*       (2010.01)
*G01Q 10/06*       (2010.01)

(52) U.S. Cl.
CPC .......... *G01Q 60/60* (2013.01); *G01Q 10/065* (2013.01)

(58) Field of Classification Search
CPC ............................ G01Q 60/60; G01Q 10/065
See application file for complete search history.

(56) References Cited

U.S. PATENT DOCUMENTS

2005/0186347 A1* 8/2005 Kim ..................... C23C 22/68
                                                   427/430.1
2012/0289642 A1* 11/2012 Tepe ...................... C09D 7/61
                                                   524/443

FOREIGN PATENT DOCUMENTS

WO    2020012097 A1    1/2020

OTHER PUBLICATIONS

International Search Report for PCT/FR2021/050422 dated Jun. 2, 2021 and translation thereof.

(Continued)

*Primary Examiner* — Nicole M Ippolito
(74) *Attorney, Agent, or Firm* — McDonald Hopkins LLC

(57) ABSTRACT

The use of the scanning electrochemical microscopy to predict the corrosion resistance results which would be obtained for a surface S1 having undergone an anticorrosion treatment if the surface S1 was subjected to a salt fog corrosion test, which use comprises an analysis of the surface S1 by scanning electrochemical microscopy.

10 Claims, 8 Drawing Sheets

(56) References Cited

OTHER PUBLICATIONS

Written Opinion for PCT/FR2021/050422 dated Jun. 2, 2021.
Search Report for French application No. FR2002450 dated Nov. 16, 2020.
Jiang, Mei-Yan et al: "Silane-incorporated epoxy coatings on aluminum alloy (AA2024). Part 1: Improved corrosion performance", Corrosion Science, Dec. 6, 2014, vol. 92, pp. 118-126.
Peng, Guangchun et al. "Ni—Fe—$Mo04^2$ LDHs/epoxy resin varnish: A composite coating on carbon steel for long-time and active corrosion protection", Progress in Organic Coatings, Elsevier, Jan. 3, 2020, vol. 140, pp. 1-10.
Xiao, Yi et al. "Evaluation of Early Degradation and Corrosion Resistance of Modified Zinc Coating with SiO2 Nanoparticles" Arabian Journal for Science and Engineering Jan. 24, 2018, 43(7), pp. 3577-3584.
Wu, Junsheng et al. "In Situ Formation of Decavanadate-Intercalated Layered Double Hydroxide Films on AA2024 and their Anti-Corrosive Properties when Combined with Hybrid Sol Gel Films" Materials, Apr. 18, 2017, 10(4), 426, pp. 2-17.
Peng, Dongdong et al. "The formation and corrosion behavior of a zirconium-based conversion coating on the aluminum alloy AA6061" Journal of Coatings Technology and Research May 23, 2016, vol. 13, pp. 837-850.

\* cited by examiner

USE OF SCANNING ELECTROCHEMICAL MICROSCOPY AS A PREDICTIVE TECHNIQUE IN A SALT FOG CORROSION TEST

CROSS-REFERENCE TO RELATED APPLICATIONS

This is a National Stage application of PCT international application PCT/FR2021/050422, filed on Mar. 12, 2021, which claims the priority of French Patent Application No. FR2002450, filed Mar. 12, 2020 both of which are incorporated herein by reference in their entireties.

TECHNICAL FIELD

The invention relates to the field of analysing and characterising surfaces by electrochemistry.

More specifically, the invention relates to the use of scanning electrochemical microscopy, more simply referred to hereinafter as SECM, the same acronym being used for the technique and the apparatus) as predictive technique of a salt fog corrosion test.

The invention finds application in all sectors of activity in which salt fog corrosion tests are used, whether industrial sectors such as the automotive, aeronautics, aerospace, railway, wind energy, construction and public works sectors, etc., research and development laboratories working on the mechanisms of the corrosion or the development of anticorrosion coatings or even laboratories specialised in the analysis and characterisation of materials.

STATE OF THE PRIOR ART

The salt fog corrosion tests (neutral, acetic or copper-acetic), more simply called "salt fog tests", are tests allowing assessing the corrosion resistance of metal materials, whether with or without coating, temporary or permanent, of protection against corrosion.

These tests are essential in sectors of activity in which metal parts are ubiquitous.

The conduct of salt fog tests is described by different standards (ASTM B117-19, NF EN ISO 9227/2017, IEC 60068-2-11, etc.). In all cases, the parts for which it is desired to assess the corrosion resistance are disposed in a test chamber in which a solution comprising either sodium chloride (neutral salt fog) or a mixture of sodium chloride and acetic acid (acetic salt fog) or even a mixture of sodium chloride, acetic acid and copper chloride (copper-acetic salt fog) is sprayed continuously under predefined temperature and pressure conditions, the principle being to expose the parts to a controlled corrosive environment.

The corrosion resistance is appreciated by a regular monitoring of the occurrence of corrosion signs, generally in the form of pitting.

According to the type of tested part, the duration of this monitoring is variable and can range from one to several weeks, which is long on an industrial scale and can be penalising.

Thus, for example, if parts made of an aluminium alloy which have been subjected to an anticorrosion treatment by chemical conversion, for example with trivalent chromium, are salt fog tested, and if a malfunction has occurred during the anticorrosion treatment (such as an inadequate concentration of the conversion bath or a too short duration of immersion of the parts in the conversion bath) causing an uncontrolled chemical conversion, it will only be known at the end of the salt fog tests (i.e. a week or more after the start of the tests) that the treated parts do not comply with the specifications. These parts will therefore not be marketable and will have to be scrapped, just as all other parts, having undergone the same anticorrosion treatment for the duration of the salt fog tests, should be. Hence a waste of time and money.

It would therefore be desirable to have a technique which allows predicting, in a fast but extremely reliable manner, the results of salt fog tests so as to be able to correct a possible malfunction in the production of metal parts or during the implementation of an anticorrosion treatment of the surface thereof and this, without having to wait for these parts to be subjected to a salt fog test.

However, to date, no such technique exists.

What does exist are predictive protocols by electrochemical impedance. However, the electrochemical impedance is an electrochemical technique whose results are averaged over the entire studied surface. The measured impedance therefore characterises an average surface state, integrating both the contribution of correctly protected areas and more fragile areas, which makes it unsuitable for the study of localised corrosion phenomena. In addition, the electrochemical impedance requires the use of complex mathematical models to process the data, which makes it difficult to consider an application in an industrial environment. Localised impedance methods exist, but they are just as complicated to implement.

What also exists is the method of Tafel lines which is the method conventionally used in R&D to assess the current and the corrosion potential of a metal material. However, this method also has a certain number of drawbacks. Indeed, the tests are difficult to reproduce, in particular in the case of complex alloys such as Al2024 aluminium alloys. They require to polarise the surface to be studied, which induces a stimulation of the passivated layer which generates modifications of the state of this surface. In the literature, the surfaces to be studied are generally exposed to a saline solution which allows triggering the corrosion phenomena before carrying out the measurements. Moreover, as in the case of the method by electrochemical impedance which is mentioned above, the measurements carried out by the method of Taffel lines are averaged over the entire studied surface. Finally, the interpretation of the obtained polarisation curves and, in particular, the plot of the tangents is a potential source of additional errors.

A few rare works in which SECM and salt fog tests have been used within the scope of the same study have been published.

These are the works of:

Jiang Mei-Yan et al. (Corrosion Science 2015, 92, 118-126, hereinafter reference [1]) on the ability of silanes to improve the anticorrosion properties of epoxy resins on 2024 aluminium alloy substrates;

Junsheng Wu et al. (Materials 2017, 10(4), 426, hereinafter reference [2]) on the anticorrosion effect of a decavanadate hydroxide based coating on 2024 aluminium alloy substrates;

Dongdong Peng et al. (Journal of Coatings Technology and Research 2016, 13, 837-850, hereinafter reference [3]), on the anticorrosion properties of a zirconium based coating on 6061 aluminium alloy substrates;

Yi Xiao et al. (Arabian Journal for Science and Engineering 2018, 43(7), 3577-3584, hereinafter reference [4]) on the corrosion resistance of a zinc coating modified with silica nanoparticles; and of Peng Guangchun et al. (Progress in Organic Coatings 2020, 140, 1-10, hereinafter reference [5]) on the ability of metal hydroxides to enhance the anticorrosion properties of epoxy varnishes on carbon steel substrates.

In all these references, the authors use SECM and the salt fog tests as complementary and non-interchangeable investigation techniques, SECM being used to understand the mechanisms by which the studied coatings are likely to protect against corrosion while the salt fog tests are used to check whether the studied coatings actually have an anticorrosion effect.

It should also be noted that, in the references [2] and [5], it is not the same samples which are subjected to the SECM analyses and to the salt fog tests, the SECM analyses being carried out in the scratches of samples having been, for this purpose, previously voluntarily scratched while the samples subjected to the salt fog tests are free of scratches.

At no time is there any link established, in references [1] to [5], between SECM and the salt fog tests apart from the fact that the results of these two investigative techniques can contribute to confirming the ability of a coating to protect a substrate against corrosion in the same manner, moreover, as the results of other investigation techniques such as the electrochemical impedance spectroscopy (see point "4. Discussion" of the reference [1]).

In addition, at no time is it said or even suggested, in references [1] to [5], that the duration of the salt fog tests would be penalising, that it would therefore be desirable to be able to eliminate the need to carry out this type of tests and that the SECM, which is a local analysis technique, would be likely to be used instead of salt fog tests which, themselves, belong to the global analysis techniques.

DISCLOSURE OF INVENTION

The invention aims at overcoming the shortcomings of the state of the art by proposing to use the SECM as a predictive technique for a salt fog corrosion test applied to a surface having undergone an anticorrosion treatment.

In other words, the invention proposes the use of SECM to predict the corrosion resistance results which would be obtained for a surface S1 having undergone an anticorrosion treatment if the surface S1 was subjected to a salt fog corrosion test, which use comprises an analysis of the surface S1 by SECM.

It is recalled that the SECM is a microscopy technique which offers the possibility of examining and imaging a surface by electrochemistry by means of a local probe which is a miniaturised electrode, called an ultramicroelectrode (or UME), and which scans this surface.

As specified above, the SECM is by nature a local analysis technique which is known to be suitable for measuring localised phenomena such as pitting corrosion of a metal surface.

What is, however, new and totally unexpected is that the SECM can also provide information representative of the corrosion resistance of the whole of a surface and allows, as such, predicting with a great reliability what will be the results of a salt fog test applied to that surface.

The SECM is conventionally implemented by means of equipment, a typical example of which is schematically illustrated in FIG. 1. As shown in this figure, this equipment, referenced 1, comprises:
an electrochemical cell 10 which is provided to be filled with an electrolyte 15 in which are immersed, under operating conditions, the surface to be analysed 11, the probe 12, a counter-electrode 13 and possibly a reference electrode 14;
a potentiostat if, under operating conditions, a potential is intended to be applied to the single probe 12 or else, as shown in FIG. 1, a bipotentiostat 16 if, under operating conditions, a potential is intended to be applied to both to the surface to be analysed 11 and to the probe 12;
a system allowing displacing the probe 12 and the surface to be analysed 11 relative to each other in three directions (x, y and z) and controlling this displacement; and
a computer system 17 for acquiring and processing data, that is to say currents measured at the probe 12 while the latter scans the surface to be analysed 11.

Moreover, a portable electrochemical microscopy device, in the form of a stylus, has recently been developed by the team of researchers to which the inventors belong. This device, which is described in international application WO 2020/012097, hereinafter reference [6], offers performance comparable to that of the equipment of the type shown in FIG. 1 while allowing eliminating the constraints imposed by this equipment and, in particular, by the limited dimensions of the electrochemical cell thereof and by the space requirement of the electrical and/or mechanical elements with which this equipment is provided to ensure and control the scanning.

Within the scope of the invention, the SECM is preferably used in "feedback" mode, denoted FD, also called regeneration mode.

However, it goes without saying that the SECM could also be used according to other modes such as:
the Redox Competition (or RC) mode, in which the substrate (i.e. the surface to be analysed) and the probe are polarised at the same potential and are put in competition to carry out the same electrochemical reaction;
the Substrate Generation/Tip Collection (or SG/TC) mode, in which the substrate generates an electroactive species which is detected by the probe; and
the Tip Generation/Substrate Collection (or TG/SC) mode, in which the probe generates an electroactive species which is detected by the substrate.

It is recalled that, in the feedback mode, the electrolytic solution comprises both a salt conferring an ionic conductivity to this solution and a redox mediator allowing oxidation-reduction reactions. The probe is polarised at a potential corresponding to the diffusion plateau of the redox mediator so as to induce an oxidation of the redox mediator if it is in reduced form or a reduction of this mediator if it is in oxidised form. Far from the surface to be analysed, the produced species diffuse freely towards the probe. However:
if the surface to be analysed is made of an insulating material and if the probe is brought closer to this surface, the diffusion of the produced species is hindered by the surface and the current measured at the probe decreases as the distance separating the tip of the probe and the surface decreases: this is called negative feedback; while
if the surface to be analysed is made of a conductive material and if the probe is brought closer to this surface, the diffusion of the produced species is also hindered, but these species are regenerated by the surface (that is to say from oxidised, they return to the reduced state or vice versa) and can again undergo an oxidation or reduction reaction such that the current measured at the probe increases as the distance separating the tip of the probe and the surface decreases: reference is made to positive feedback.

In accordance with the invention, the analysis of the surface S1 can, in the first place, comprise a scanning of this surface with the probe, the tip of the probe being maintained at a constant distance d from the surface S1 during this scanning.

In which case, during the scanning, the tip of the probe preferably follows a trajectory which comprises one or more rectilinear portions.

The trajectory followed by the tip of the probe may comprise only one rectilinear portion; in this case, reference will be made, in what follows, to SECM analysis by "linescan" (or online scanning).

Alternatively, the trajectory followed by the tip of the probe can comprise several rectilinear parts, advantageously parallel to each other; in this case, reference will be made, in what follows, to SECM analysis by "mapping".

The analysis of the surface S1 can, secondly, comprise a positioning of the probe at several points directly above this surface, the tip of the probe being located at a constant distance d from the surface S1 at each positioning point.

The probe positioning points are preferably randomly selected; in this case, reference will be made, in what follows, to SECM analysis by "statistics". This type of SECM analysis is particularly advantageous because of the speed with which it can be performed.

For an SECM analysis by statistics, the use of a portable device as described in the international application WO 2020/012097 is particularly recommended to the extent that this device allows guaranteeing, at each positioning point, that the probe is well perpendicular to the surface to be analysed and, thereby, that the distance d is well respected, regardless of the configuration of the surface.

In the case where the analysis of the surface S1 comprises a scanning of this surface with the probe, then this use preferably comprises at least the steps consisting in:
a) selecting a point directly above the surface S1;
b) bringing, at the point selected in step a), the tip of the probe to the distance d; and
c) scanning the surface S1 with the probe from the point selected in step a) by maintaining the tip of the probe at the distance d and measuring the current at the probe during scanning.

In the case where the analysis of the surface S1 comprises a positioning of the probe at several points located directly above this surface, then this use comprises at least the steps consisting in:
a) selecting the probe positioning points; and
b) bringing, for each positioning point, the tip of the probe to the distance d and measuring the current at the probe at each positioning point.

In both cases, the distance d is advantageously previously determined by establishing an approach curve.

As known per se, the establishment of an approach curve consists in placing the probe at infinity from the surface to be analysed (that is to say at a distance from the surface which is sufficiently high so that this surface does not impact the value of the current measured at the probe) then in gradually bringing the probe closer to the surface, perpendicular to this surface (direction z), while measuring the current at the probe (which, it is recalled that it decreases or increases according to the insulating or conductive property of the surface) until the tip of the probe comes into contact with the surface, which allows setting the zero point of the positioning of the tip of the probe. The probe is then raised until bringing the tip thereof to the distance from the surface which is desired for the measurement, or distance d.

Typically, the distance d is comprised between $1/10^{th}$ of the diameter of the conductive portion of the probe and the diameter of this conductive portion. Thus, for example, for a probe consisting of a metal wire sealed in a glass capillary, the distance d is typically comprised between $1/10^{th}$ of the diameter of the metal wire and the diameter of this wire, i.e. between 5 µm and 50 µm if the wire is 50 µm in diameter.

As also known per se, the scanning of the surface S1 with the probe or the positioning of the probe at a plurality of points directly above the surface S1 can be obtained by a displacement in a horizontal plane (x, y):
either of the surface S1, the probe then being immobilised in this horizontal plane;
or of the probe, the surface S1 then being immobilised in said horizontal plane.

Regardless of the manner in which the analysis of the surface S1 is carried out (analysis by mapping, by linescan or by statistics), it is preferred in the context of an industrial exploitation of the invention:
i) measuring, under previously selected operating conditions (distance d, composition of the electrolytic solution, electric potential applied to the probe, electric potential applied to the surface S1 where appropriate, scanning speed of the probe where appropriate), the current at the probe at $n_1$ different points of the surface S1 to obtain $n_1$ current values, $n_1$ being an integer which is at least equal to 5;
ii) determining the percentage of the $n_1$ current values obtained in step i) which are greater than or equal to a detection threshold D, any current value which is greater than or equal to D being considered as corresponding to a point on the surface S1 likely to be corroded in the salt fog test; and
iii) determining, from the percentage obtained in step ii), the number N of corrosion points/unit area likely to be presented by the surface S1 if it was subjected to the salt fog test and comparing the number of corrosion points/unit area thus obtained with the maximum number $N_{max}$ of corrosion points/unit area that the surface S1 should have to successfully pass the salt fog test.

Whereby:
if N is less than $N_{max}$, then it is possible to predict that the surface S1 will effectively successfully pass this test; while
if N is greater than $N_{max}$, then it is possible to predict that this surface will not successfully pass this test.

In accordance with the invention, D is, preferably, previously determined by measuring, by means of the probe used in step i) and under the operating conditions used in step i), the current at the probe at $n_2$ points different from a reference surface S2, which is free from corrosion and which is not likely to be corroded by the salt fog test, to obtain $n_2$ current values, $n_2$ being an integer at least equal to 2, by calculating the average of the $n_2$ obtained current values and by selecting a current value which is, for example 10%, 15% or 20%, higher than this average, but lower than the highest value of the $n_2$ current values.

However, D can be previously determined otherwise. Thus, for example:
D can correspond to a current value which is, for example 110% or more, higher than the highest value of the $n_2$ current values measured for the reference surface S2; or
D can be selected based on an expected current value for the probe and the operating conditions used in step i) if this probe and these operating conditions have already been used to analyse by SECM one or more surfaces other than the surface S1.

The reference surface S2 can be a surface of the same nature as the surface S1 (for example, made of the same material and having undergone the same anticorrosion treatment), but this is not compulsory, the important thing being that the surface S2 has the same roughness as surface S1 and is neither corroded nor likely to be corroded by the salt fog test. Thus, it may in particular be the surface of a commercially available test piece or a surface from the same manufacturing line as the surface S1, but which will be previously checked that it is not likely to be corroded by the salt fog test.

In step iii), the determination of N preferably comprises a correlation of this percentage with a percentage P having been previously obtained for a reference surface S3 having been subjected both to an analysis by SECM and to the salt fog test and for which:
- on the one hand, the percentage P has been determined by measuring, by means of the probe used in step i) and under the operating conditions used in step i), the current at the probe at $n_3$ different points of the surface S3 to obtain $n_3$ current values, $n_3$ being an integer which is at least equal to 5 and by determining the percentage of the $n_3$ values greater than D;
- on the other hand, it has been established that the percentage P corresponds to a number of corrosion points/unit area revealed by the salt fog test.

Thus, N can in particular be determined by dividing the percentage obtained in step ii) by P and by multiplying the quotient of this division by the number of corrosion points/unit area revealed on the surface S3 by the salt fog test.

If the salt fog test which results are desired to be predicted is a test meeting a standard such as an ASTM B117-19, NF EN ISO 9227/2017 or IEC 60068-2-11 test, then $N_{max}$ is given by this standard.

Moreover, in the case where the invention is implemented to predict the corrosion resistance results which would be obtained for a plurality of surfaces if these surfaces were subjected to the same type of salt fog test, then the detection threshold D and the percentage P can be determined once and for all and be used for all surfaces provided, of course, that the analysis by SECM of said surfaces is carried out with the same probe and under the same operating conditions as those used for determine this detection threshold and this percentage.

In the foregoing, the expression "current measured at the probe" preferably, but not necessarily, designates a normalised current $I/I_{inf}$, I being the current measured at the probe at the distance d from the surface while $I_{inf}$ is the current measured at the probe when the probe is at infinity from the surface.

In accordance with the invention, the analysis of the surface S1 is preferably carried out with an electrolyte comprising a redox mediator in the reduced state.

Such a mediator is, for example, ferrocyanide ($Fe(CN)_6^{4-}$), ferrocene ($FcCp_2$), decamethylferrocene ($Me_{10}(FcCp_2)$) or ferrocene dimethanol ($Fe(MeOH)_2$).

However, it goes without saying that an electrolyte comprising a redox mediator in the oxidised state is also likely to be used.

As known per se, the electrolyte can be in a liquid form. However, if SECM is implemented with a portable device, it can also be in the form of a gel.

When the electrolyte is in a liquid form, then it is advantageously either an aqueous or organic solution comprising, in addition to the redox mediator, at least one compound capable of being ionised in solution, for example a mineral or organic salt, or an ionic liquid.

When the electrolyte is in the form of a gel, then it is advantageously a gel obtained by adding a gelling agent of the gelatine, pectin, agar-agar, alginate, arabic gum, xanthan gum, carrageenan or the like, to an aqueous or organic solution as defined above or to an ionic liquid.

The salt can in particular be a metal salt and, in particular, an alkali metal such as sodium chloride or potassium chloride.

The invention has many advantages. Indeed, it allows predicting in an extremely reliable manner what will be the results of salt fog tests and this, by analyses:
- whose results are obtained quickly (in the range of 1 hour for a sample analysed by mapping, in the range of a few minutes for a sample analysed by linescan),
- which can be carried out both on control samples of parts and on the parts themselves if, for example, a portable device as described in the international application WO 2020/012097 is used,
- which can also be carried out on all types of materials whose corrosion resistance is likely to be analysed by salt fog tests.

Other features and advantages of the invention will emerge from the following additional description, which relates to examples of implementation of the invention having allowed validating it.

Of course, this additional description is only given by way of illustration of the object of the invention and in no way constitutes a limitation of this object.

DETAILED PRESENTATION OF PARTICULAR IMPLEMENTATIONS

Example 1: Predictions by SECM Analyses by Mapping on Reference Samples

Samples of two Al2024 aluminium alloys, respectively anodised and non-anodised, whose corrosion resistance is known and which can therefore be used as references, are subjected to SECM analyses by mapping, using the following operating conditions:

probe: UME consisting of a platinum wire 12 cm long and 50 μm in diameter sealed in a glass capillary;
reference electrode: Ag/AgCl;
counter electrode: gold;
liquid electrolyte comprising potassium chloride as salt and ferrocene dimethanol ($Fe(MeOH)_2$) at 1 mmol/L as redox mediator;
potential applied by potentiostat to the probe: 0.6 V;
potential applied to the samples: none (OCP mode);
distance d (probe tip/sample surface): 10 μm;
surface scanning speed by the probe: 10 μm/s.

The anodised alloy has a protective layer made of aluminium oxide, about 8 μm thick, which gives it high corrosion resistance.

The non-anodised alloy has, itself, a low corrosion resistance.

Figure 1:
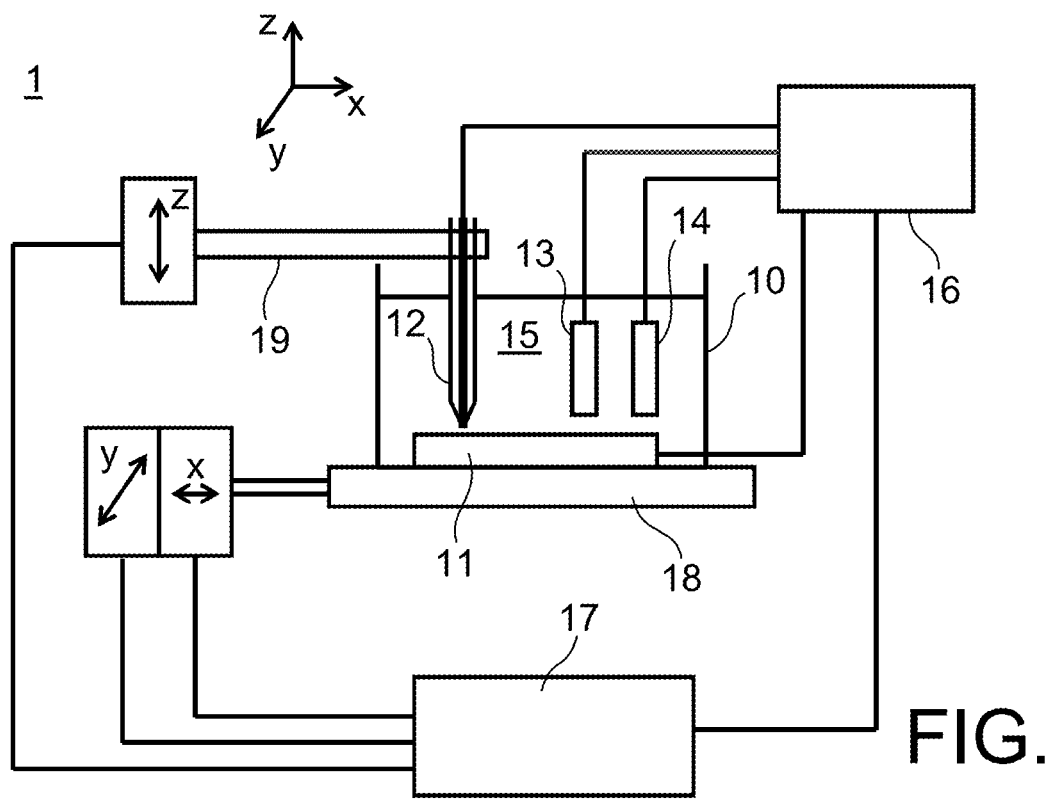
FIG. 1, already commented on, schematically illustrates a typical example of SECM equipment as used in the laboratory.
Figure 2:
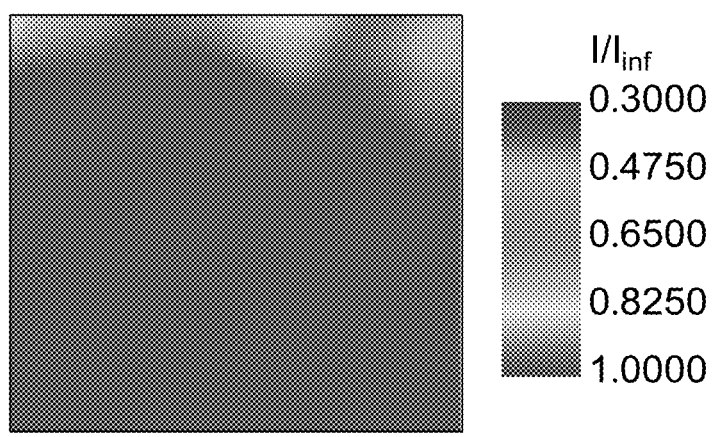
FIG. 2 shows the results of a SECM analysis by mapping as obtained for a sample of a non-anodised Al2024 aluminium alloy.
Figure 3:
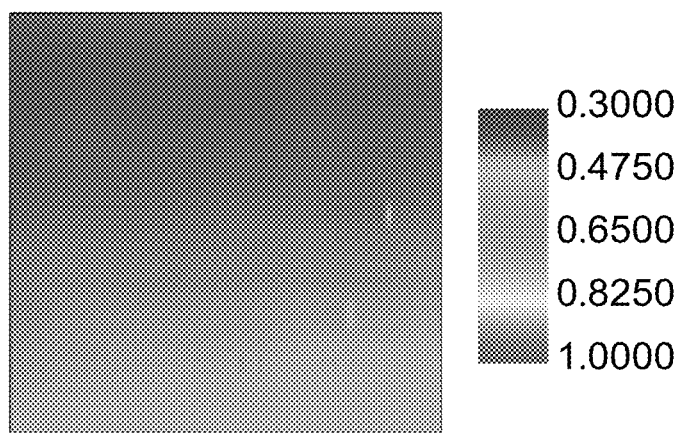
FIG. 3 shows the results of an SECM analysis by mapping for a sample of an anodised Al2024 aluminium alloy.

The obtained maps for samples of each of the two alloys are illustrated in FIGS. 2 and 3, FIG. 2 corresponding to a sample of the non-anodised alloy and FIG. 3 corresponding to a sample of the anodised alloy. On the right margin of each of these figures, there is represented a scale of the values of the normalised current, denoted $I/I_{inf}$, measured at the probe, which corresponds to the ratio between the current I actually measured at the probe during the scanning of the surface of the samples and the current $I_{inf}$ measured at the probe when the tip of the probe is at infinity from the surface of the samples.

As shown in these figures, the obtained map for the non-anodised alloy sample shows that this sample has a uniformly high surface conductivity (with $I/I_{inf}$>0.9) which may result in a sensitivity of the surface of this sample to the pitting corrosion, while the map obtained for the anodised alloy sample shows that this sample has, on the contrary, a uniformly low surface conductivity (with $I/I_{inf}$<0.4) testifying a priori to the quality of passivation of the protective layer contained in this sample.

In order to check whether these maps allow predicting that salt fog tests will reveal that only the anodised alloy samples are compliant, samples of both types of alloy are subjected to salt fog tests under the following conditions:

neutral salt fog (NaCl solution);
temperature and pressure prevailing in the test chamber: 35° C.—1 bar;
NaCl concentration of the sprayed solution: 50 g/L;
inlet flow rate of the solution sprayed into the test chamber: 1.8 L/h;
flow rate of the collected sprayed solution (condensate): 2 mL/h;
duration of the tests: 168 hours.

Figure 4:
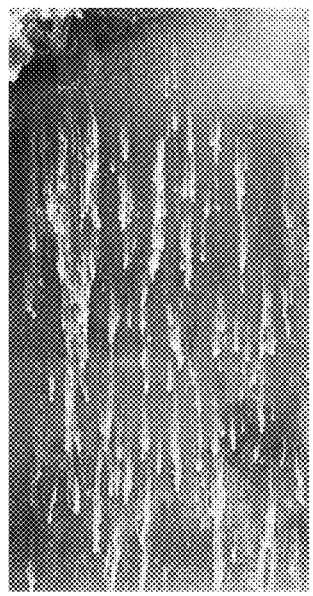
FIG. 4 shows, seen from the front, a sample of a non-anodised Al2024 aluminium alloy as obtained after a 168-hour neutral salt fog test.
Figure 5:
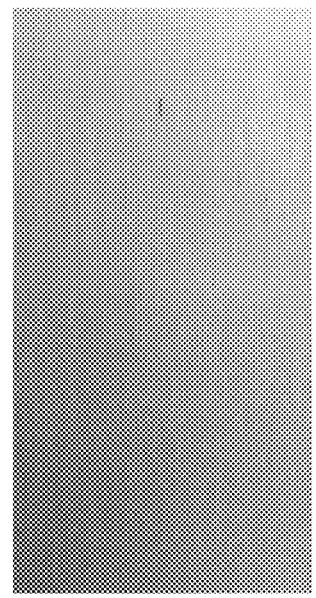
FIG. 5 shows, seen from the front, a sample of an anodised Al2024 aluminium alloy as obtained after a 168-hour neutral salt fog test.

The results of these tests are presented in Table I below and in FIGS. 4 and 5, FIG. 4 corresponding to a sample of the non-anodised alloy and FIG. 5 corresponding to a sample of the anodised alloy.

It should be noted that a sample is considered to be compliant if it has less than 2.5 pitting/$dm^2$ after 168 hours of exposure to salt fog according to the standard NF EN ISO 9227.

TABLE I

| Samples | Number of pitting/$dm^2$ | Results |
|---|---|---|
| Non-anodised Al2024 | >50 | non-compliant |
| Anodised Al2024 | <2 | compliant |

This table and these figures show that the results of the salt fog tests are in perfect agreement with the predictions obtained by the SECM tests in mapping mode, thus confirming the possibility of using the SECM as a predictive technique for salt fog tests.

It is important to note that the results of the salt fog tests required 7 days of waiting while the SECM analyses by mapping have, themselves, been carried out in a single half-day.

Example 2: Predictions by SECM Analyses by Linescan on Reference Samples

Samples of the two Al2024 aluminium alloys, respectively anodised and non-anodised, tested in the example 1 above are also subjected to SECM analyses by linescan in order to check whether this mode of implementation of an SECM analysis, which is faster than mapping, also allows reliably predicting salt fog test results.

These analyses are carried out using the same operating conditions as those indicated in the example 1 above.

Figure 6:
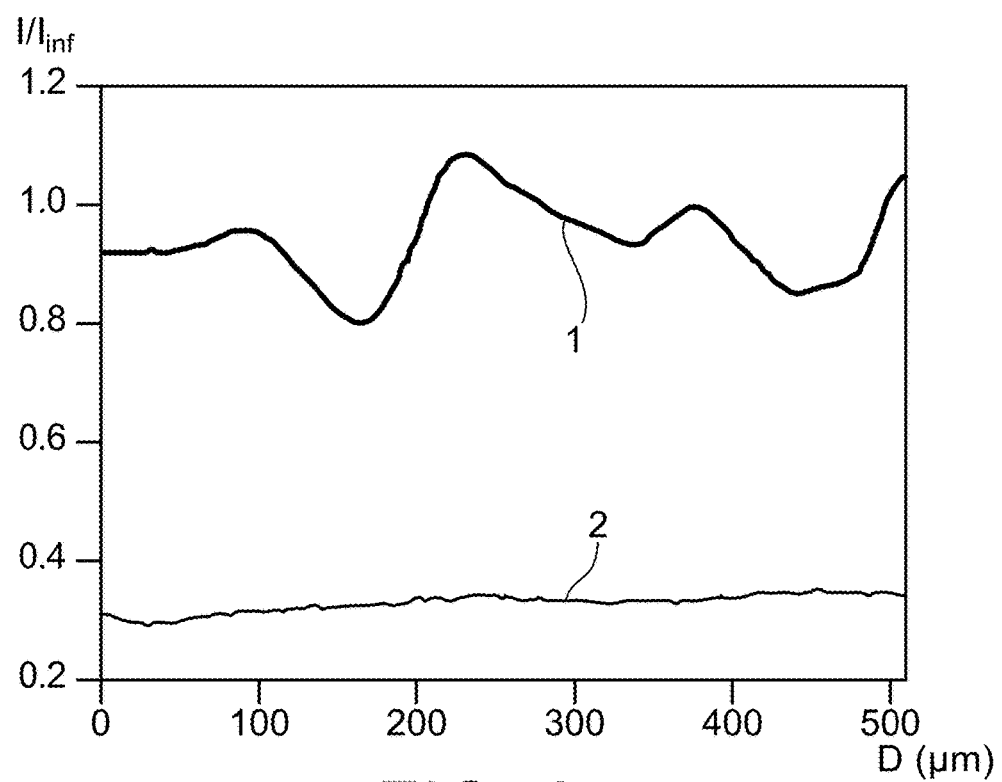
FIG. 6 shows the results of SECM analyses by linescan as obtained for, on the one hand, a sample of a non-anodised Al2024 aluminium alloy (curve 1) and, on the other hand, a sample of an anodised Al2024 aluminium alloy (curve 2); in this Figure, the ordinate axis corresponds to the normalised current $I/I_{inf}$ measured at the probe, while the abscissa axis corresponds to the distance D, expressed in µm, travelled in line by the probe.

The results are shown in FIG. 6.

In this Figure, the curve 1, which corresponds to the non-anodised alloy sample, shows a very high feedback (with $I/I_{inf}$ close to 1) testifying to the sensitivity of the surface of this sample to corrosion. It also reveals significant variations in the normalised current $I/I_{inf}$, indicating the presence of corrosion spots.

Conversely, the curve 2, which corresponds to the anodised aluminium alloy sample, shows very low feedback (with $I/I_{inf}$ substantially equal to 0.3 over the entire distance travelled by the probe) as well as the absence of variations in the surface conductivity.

These results are therefore in perfect agreement with the maps shown in the example 1 above and demonstrate that the use of the SECM by linescan allows obtaining predictive results which are just as relevant as those obtained by a SECM by mapping.

Example 3 Predictions by SECM Analyses by Mapping on Samples which are Anticorrosion Treated by Trivalent Chromium Conversion In order to demonstrate the industrial interest of the invention, a series of analyses (SEM, Tafel lines, salt fog tests, SECM analyses) is carried out not on reference samples as in Examples 1 and 2 above, but on two series of Al2024 aluminium alloy samples—referred to as series 3 and 4 hereinafter—having been anticorrosion treated by $Cr^{III}$ conversion.

Indeed, this type of anticorrosion treatment being still, to date, less well controlled than anodising, it leads to parts whose corrosion resistance varies from one batch of treated parts to the other, so that salt fog tests are still currently essential to check whether these parts are compliant.

3.1 Anticorrosion Treatment by $Cr^{III}$ Conversion

The anticorrosion treatment by $Cr^{III}$ conversion is performed in three steps:
- a first step which consists in immersing the alloy samples for 5 minutes in a bath comprising 40 vol. % of Socosurf™ 1858, 10 vol. % of Socosurf™ 1806 and 50% demineralised water, this bath being maintained at 50° C. under stirring, then rinsing the samples with distilled water;
- a second step which consists in immersing the alloy samples for 10 minutes in a bath comprising 35 vol. % of Socosurf™ TCS and 65 vol. % of demineralised water, this bath being maintained at 40° C. under stirring, then rinsing the samples with demineralised water; and
- a third step which consists in immersing the alloy samples for 5 minutes in a bath comprising 10 vol. % of Socosurf™ PACS, 6 vol. % of hydrogen peroxide ($H_2O_2$) at 35% and 8 vol. % of demineralised water, this bath being maintained at ambient temperature under stirring, then rinsing the samples with demineralised water and, finally, drying them with compressed air.

At the end of this treatment, all samples have, in principle, a protective layer mainly made of chromium and zirconium oxides, about 200 nm thick.

3.2 Analysis of the Samples by Optical Microscopy

Figure 7:
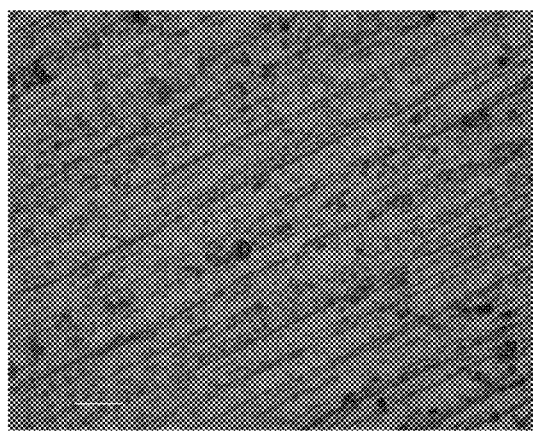
FIG. 7 is an image taken under an optical microscope of a first sample of an Al2024 aluminium alloy having undergone an anticorrosion treatment by trivalent chromium conversion.
Figure 8:
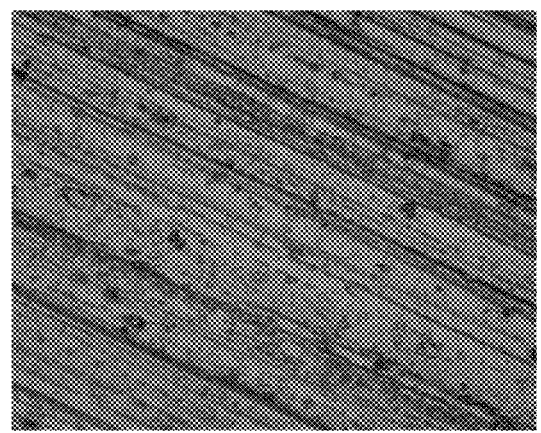
FIG. 8 is an image taken by SEM of a second sample of an Al2024 aluminium alloy having undergone an anticorrosion treatment by trivalent chromium conversion.

As shown in FIGS. 7 and 8, which correspond to images of the surface of a sample from the series 3 (FIG. 7) and the surface of a sample from the series 4 (FIG. 8), no difference between the surfaces of the two samples is detectable by optical microscopy. The anticorrosion layers of the two samples appear to have similar morphologies.

3.3 Method of Tafel Lines

Cyclic voltammetry tests are carried out on samples belonging to the series 3 and 4 in order to plot and exploit the Tafel lines since this characterisation method is regularly used in R&D to assess the current and the corrosion potential of a metal material.

These tests are carried out using the following operating conditions:
- working electrode: sample of Al2024 aluminium alloy which is anticorrosion treated by $Cr^{III}$ conversion;
- reference electrode: Ag/AgCl;
- counter-electrode: gold;
- electrolyte: KCl 0.1 mol/L;
- scanning speed: 10 mV/s.

Successive Cyclic Voltammetry Tests on the Same Sample from the Series 4

Three cyclic voltammetry tests are carried out successively on the same sample from the series 4.

The polarisation curves $\log|I|=f(E)$ as well as the Tafel lines are then plotted.

Figure 9:
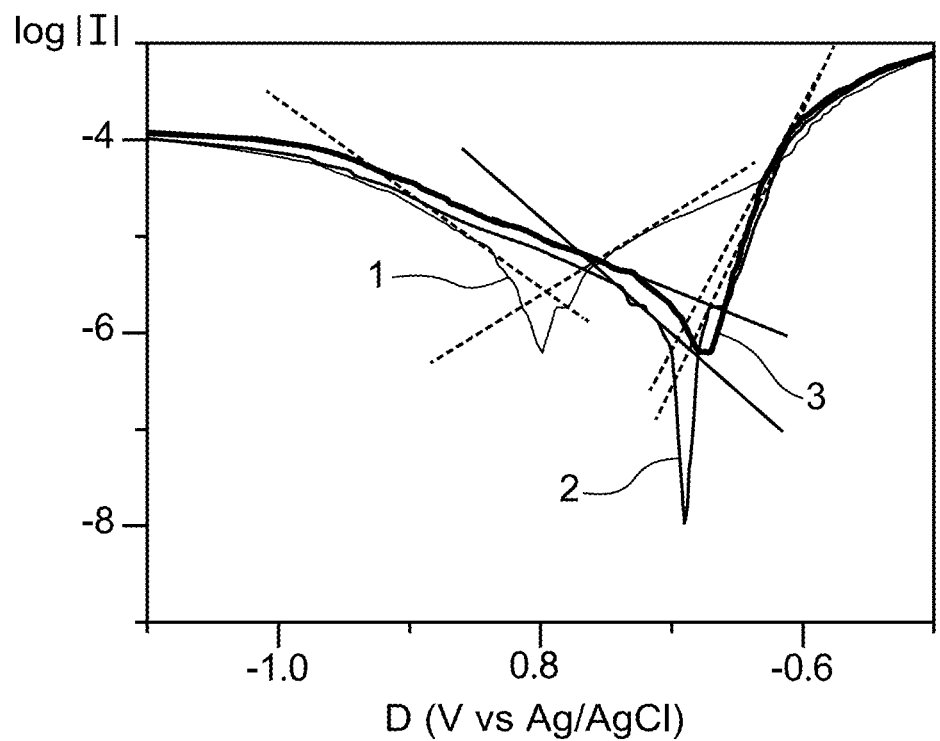
FIG. 9 shows the three polarisation curves, denoted 1, 2 and 3 respectively, obtained by subjecting the same sample of an Al2024 aluminium alloy, previously anticorrosion treated by trivalent chromium conversion, to three successive cyclic voltammetry tests, as well as the Tafel lines plotted from these curves; in this Figure, the ordinate axis corresponds to the logarithm of the absolute value of the current, denoted log|I|, while the abscissa axis corresponds to the potential, denoted E and expressed in volts, applied to the sample of aluminium alloy.

The results are shown in FIG. 9 in which the curves 1, 2 and 3 correspond respectively to the first, second and third cycles.

As shown in this Figure, very different results are obtained from one cycle to another, which highlights an evolution of the surface of the sample during manipulation. The passivated layer is stimulated during the measurement by the polarisation of the sample, which generates modifications of its surface state.

Figure 10:
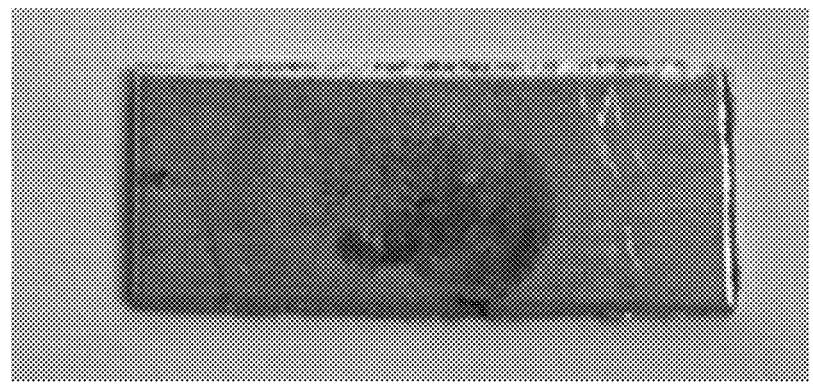
FIG. 10 shows, seen from the front, a sample of an Al2024 aluminium alloy, previously anticorrosion treated by trivalent chromium conversion, after having subjected this sample to three successive cyclic voltammetry tests.

These modifications are moreover visible to the naked eye, as shown in FIG. 10, which is a photograph of the surface of the sample taken at the end of the third voltammetry cycle and on which a blackened area is visible at the exact location where the measurement has been performed.

Cyclic Voltammetry Tests on Samples from the Series 3 and 4

A cyclic voltammetry test is carried out on a sample from each of the series 3 and 4 with the aim of checking whether the method of Tafel line allows differentiating the corrosion resistance of the protective layers of these samples.

Again, the polarisation curves $\log|I|=f(E)$ and the Tafel lines are then plotted.

Figure 11:
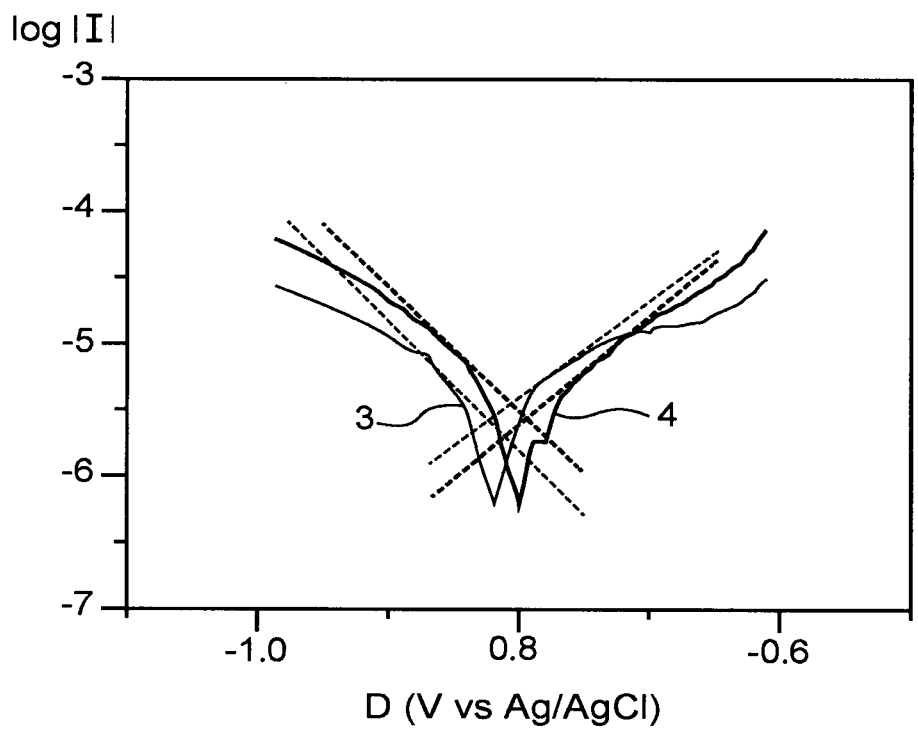
FIG. 11 shows the polarisation curves, respectively 3 and 4, obtained by subjecting two different samples of an Al2024 aluminium alloy, previously anticorrosion treated by trivalent chromium conversion, to a cyclic voltammetry test, as well as the Tafel lines plotted from these curves; in this Figure, the ordinate axis corresponds to the logarithm of the absolute value of the current, denoted log|I|, while the abscissa axis corresponds to the potential, denoted E and expressed in volts, applied to the sample of aluminium alloy.

The results are shown in FIG. 11 in which the curves are respectively denoted 3 and 4 depending on the series to which the sample belongs.

As this figure shows, very similar results are obtained on the two samples (very close corrosion potential and current).

However, as highlighted in point 3.5 below, salt fog tests on these two samples lead to very different results. This highlights that the exploitation of the Tafel lines via a cyclic voltammetry is not an adequate method to differentiate between two samples having undergone the same type of anticorrosion treatment, but nevertheless having different corrosion resistances.

3.4 SECM Analyses

SECM Analyses by Linescan on the Same Sample from the Series 4

A sample from the series 4 is subjected to three successive SECM analyses by linescan, the three analyses being carried out on the same area of the sample and using the same operating conditions as those described in the example 1.

Figure 12:
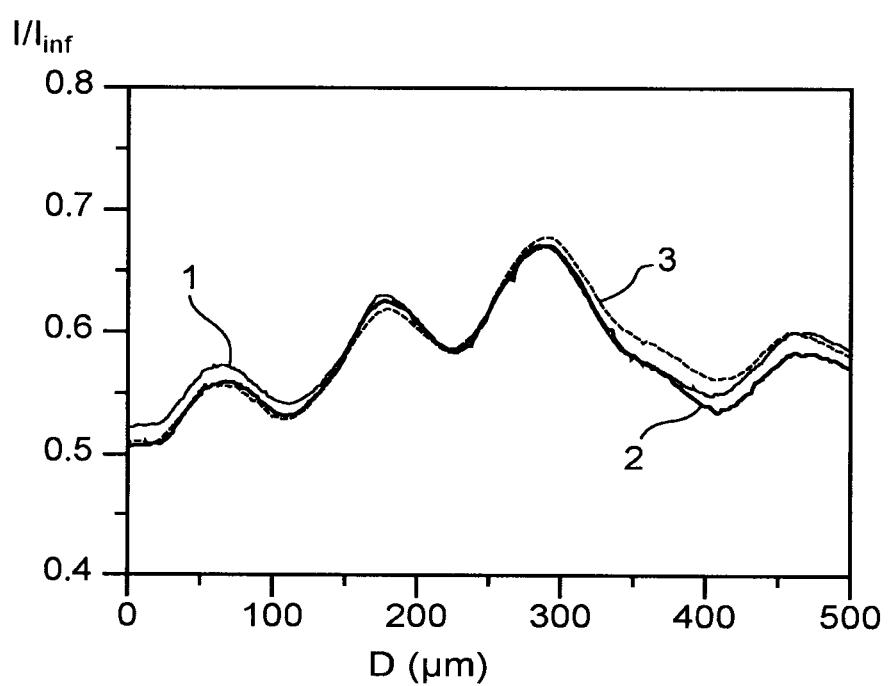
FIG. 12 shows the results of three SECM analyses by linescan, denoted 1, 2 and 3 respectively, having been carried out on the same area of a sample of an Al2024 aluminium alloy previously anticorrosion treated by trivalent chromium conversion; in this Figure, the ordinate axis corresponds to the normalised current $I/I_{inf}$ measured at the probe, while the abscissa axis corresponds to the distance D, expressed in μm, travelled by the probe during each analysis.

The results are shown in FIG. 12 in which the curves 1, 2 and 3 correspond respectively to the first, second and third scans of the sample area by the probe.

As shown in this Figure, the curves 1, 2 and 3 are almost identical, which means that an SECM analysis does not induce any alteration of the surface of the sample.

SECM Analyses by Mapping on Samples from the Series 3 and 4

SECM analyses by mapping are carried out on samples belonging to the series 3 and 4 using the same operating conditions as those described in the example 1.

Figure 13:
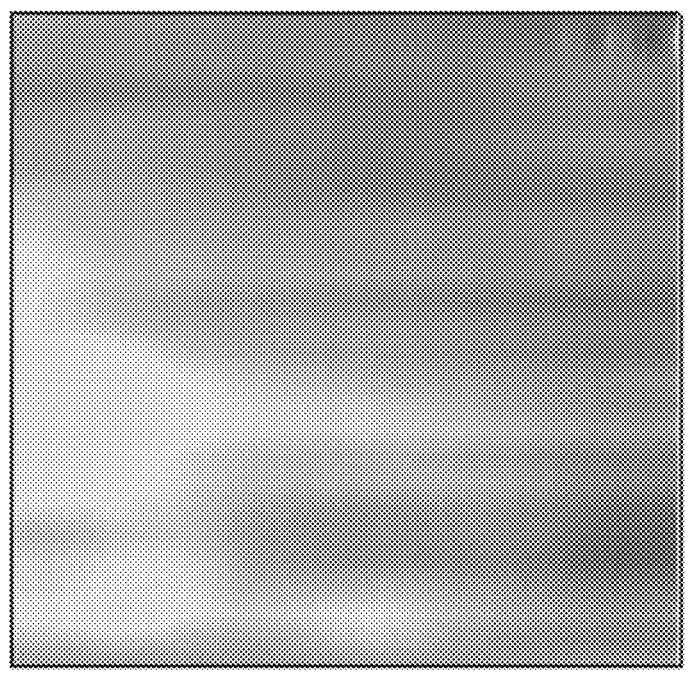
FIG. 13 shows the results of an SECM analysis by mapping as obtained for a first sample of an Al2024 aluminium alloy previously anticorrosion treated by trivalent chromium conversion.
Figure 14:
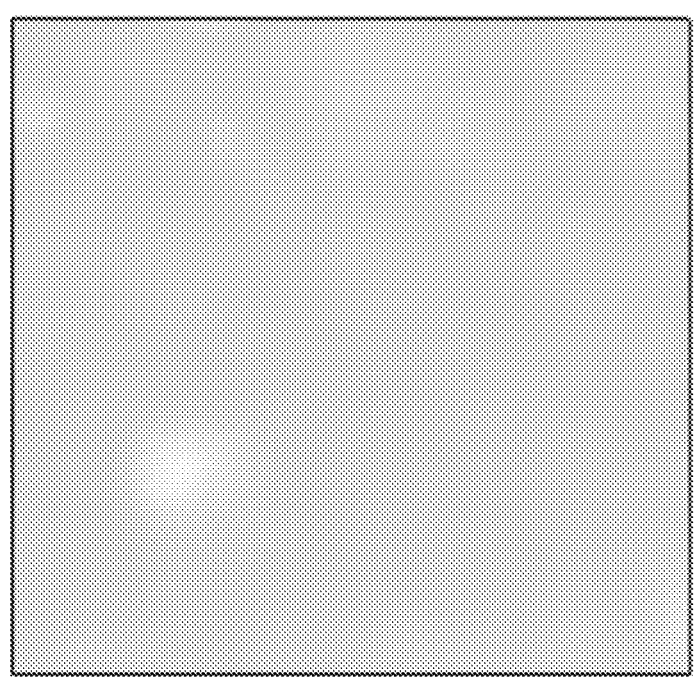
FIG. 14 shows the results of an SECM analysis by mapping as obtained for a second sample of an Al2024 aluminium alloy previously anticorrosion treated by trivalent chromium conversion.

The maps obtained for samples from each of the two series are illustrated in FIGS. 13 and 14, FIG. 13 corresponding to a sample from the series 3 and FIG. 14 corresponding to a sample from the series 4. On the right margin of each of these figures, a scale of the values of the normalised current $I/I_{inf}$, which is measured at the probe, is represented.

These maps show that the sample from the series 4 has a surface conductivity which is uniformly higher (with $I/I_{inf} \approx 0.7$) than that of the sample from the series 3, which may result in a greater sensitivity of the surface of this sample to corrosion. The map of the sample from series 4 further reveals more conductive areas which are potentially sensitive to pitting.

The sample from the series 3 has, itself, a uniformly low surface conductivity (with $I/I_{inf} \approx 0.4$) which testifies to the passivation quality of the anticorrosion layer of this sample.

These obtained maps allow predicting that the results of salt fog tests will be different for the two series of alloys and that the alloy from the series 3 will have a corrosion resistance which is higher and assuredly of high quality while the alloy from the series 4 will present a lower corrosion resistance (this corrosion resistance must however be better than that of an untreated Al2024 alloy for which values of $I/I_{inf}$ in the range of 1 have been obtained—see examples 1 and 2).

Consequently, the predictions are as follows:

alloy from the series 3→compliant with the salt fog;
alloy from the series 4→non-compliant with the salt fog.

3.5 Salt Fog Tests

Samples from the series 3 and 4 are subjected to 168-hour salt fog test under the same operating conditions as those described in the example 1 above.

Figure 15:
FIG. 15 shows, seen from the front, a first sample of an Al2024 aluminium alloy, previously anticorrosion treated by trivalent chromium conversion, as obtained after a 168-hour neutral salt fog test.
Figure 16:
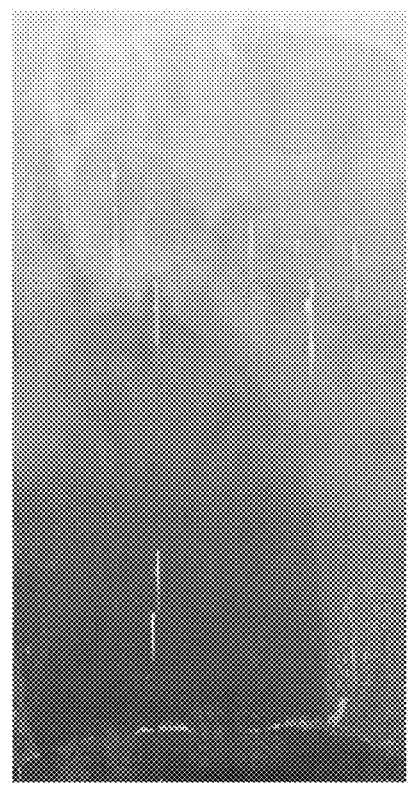
FIG. 16 shows, seen from the front, a second sample of an Al2024 aluminium alloy, previously anticorrosion treated by trivalent chromium conversion, as obtained after a 168-hour neutral salt fog test.

The results of these tests are presented in Table II below and in FIGS. 15 and 16, FIG. 15 corresponding to a sample from the series 3 and FIG. 16 corresponding to a sample from the series 4.

TABLE II

| Samples | Number of pitting/dm$^2$ | Results |
|---|---|---|
| Al2024 from the series 3 | <2 | Compliant |
| Al2024 from the series 4 | ~10 | Non-compliant |

This table and these figures confirm the predictions made above and, thereby, that the corrosion resistance diagnostics carried out by SECM are extremely reliable.

Example 4: Predictions by SECM Analysis by Statistics

An SECM analysis by statistics is carried out on a sample of an Al2024 aluminium alloy, previously anticorrosion treated by trivalent chromium conversion.

The used operating conditions are identical to those described in the example 1 with the slight difference that there is no scanning of the surface of the sample by the probe, but a positioning of the probe at different points located directly above the surface of the sample, the tip of the probe being 10 µm from said surface at each positioning point. The points are randomly selected by a computer program developed for this purpose.

By way of comparison, an SECM analysis by mapping is also performed on the same sample.

Figure 17:
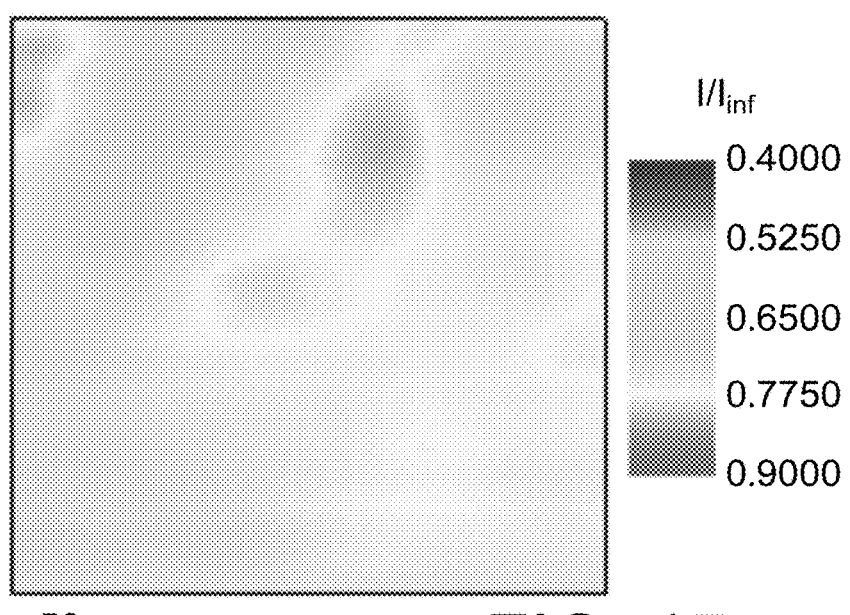
FIG. 17 shows the results of an SECM analysis by mapping as obtained for a third sample of an Al2024 aluminium alloy, previously anticorrosion treated by trivalent chromium conversion.
Figure 18:
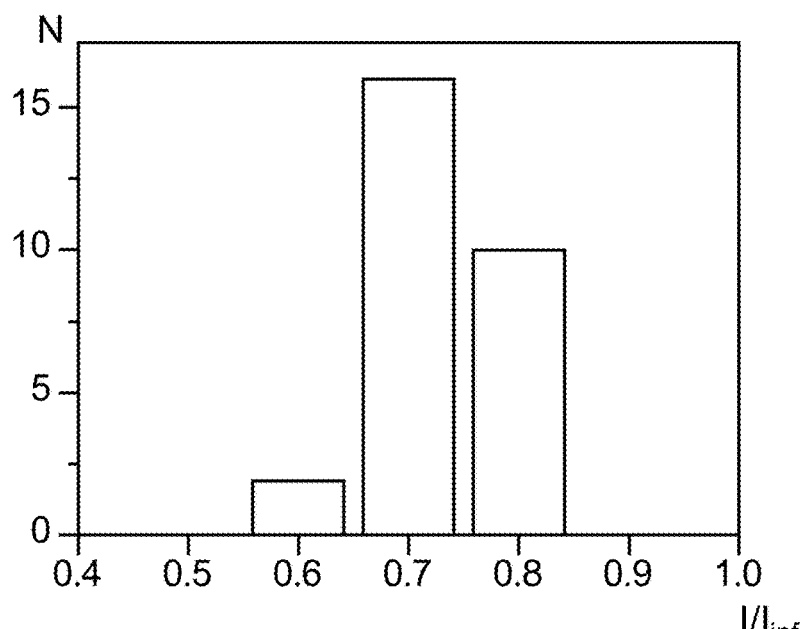
FIG. 18 shows the results of an SECM analysis by statistics as obtained for a third sample of an Al2024 aluminium alloy, previously anticorrosion treated by trivalent chromium conversion; in this Figure, the ordinate axis corresponds to the number N of iterations while the abscissa axis corresponds to the normalised current $I/I_{inf}$ measured at the probe.

The results of these two analyses are shown in FIGS. 17 and 18, FIG. 17 corresponding to the map obtained by the analysis in mapping mode and FIG. 18 corresponding to the classification of the values of the normalised current $I/I_{inf}$ measured at the probe during analysis in statistics mode.

These figures highlight the existence of a concordance between the results obtained by mapping and those obtained by statistics which, both, show that the surface conductivity of the sample is generally high, with values $I/I_{inf}$ between 0.7 and 0.8, which allow predicting that this sample will be considered non-compliant at the end of a salt fog test.

The sample is therefore subjected to a 168-hour salt fog test under the same operating conditions to those described in the example 1 above.

Figure 19:
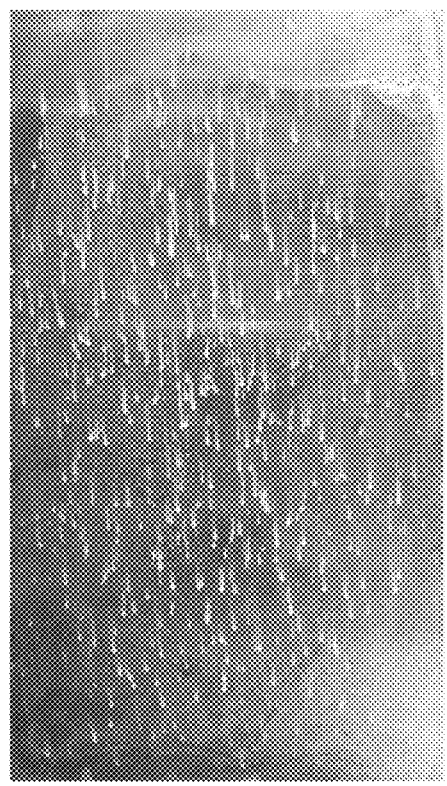
FIG. 19 shows, seen from the front, a third sample of an Al2024 aluminium alloy, previously anticorrosion treated by trivalent chromium conversion, as obtained after a 168-hour neutral salt fog test.

The results of this test are illustrated in FIG. 19 which shows a significant number of pitting (50/dm$^2$), confirming the non-compliance of the sample and, thereby, the predictive value of the SECM analysis by statistics.

CITED REFERENCES

[1] Jiang Mei-Yan et al., Corrosion Science 2015, 92, 118-126
[2] Junsheng Wu et al., Materials 10(4), 2017, 426
[3] Dongdong Peng et al., Journal of Coatings Technology and Research 2016, 13, 837-850
[4] Yi Xiao et al., Arabian Journal for Science and Engineering 2018, 43(7), 3577-3584
[5] Peng Guangchun et al., Progress in Organic Coatings 2020, 140, 1-10
[6] WO-A-2020/012097

What is claimed is:

1. A process for predicting corrosion resistance results which would be obtained for a surface S1 having undergone an anticorrosion treatment if the surface S1 was subjected to a salt fog corrosion test, the process comprising an analysis of the surface S1 by scanning electrochemical microscopy, wherein the analysis comprises the following actions:

i) measuring, under previously selected operating conditions, a current at n1 different points of the surface S1 by means of a scanning electrochemical microscopy probe to obtain n1 current values, n1 being an integer which is at least equal to 5;

ii) determining the percentage of the n1 current values obtained in step i) which are greater than or equal to a detection threshold D, any current value which is greater than or equal to D being considered as corresponding to a point on the surface S1 likely to be corroded in the salt fog test; and iii) determining, from the percentage obtained in step ii), the number N of corrosion points/unit area likely to be presented by the surface S1 if it was subjected to the salt fog test and comparing the number of corrosion points/unit area thus obtained with the maximum number Nmax of corrosion points/unit area that the surface S1 should have to successfully pass the salt fog test, whereby:

if N is less than the maximum number Nmax, then it is possible to predict that the surface S1 will effectively successfully pass this test, while if N is greater than the maximum number Nmax, then it is possible to predict that this surface will not successfully pass this test.

2. The process of claim 1, wherein the analysis of the surface S1 is carried out in feedback mode.

3. The process of claim 2, wherein the analysis of the surface S1 comprises a scanning of the surface S1 with the scanning electrochemical microscopy probe and wherein a tip of the probe is maintained at a constant distance d from the surface S1 during scanning the surface.

4. The process of claim 3, wherein the tip of the probe follows, during scanning the surface S1, a trajectory comprising one or more rectilinear portions.

5. The process of claim 4, wherein the tip of the probe follows, during scanning, a trajectory comprising several rectilinear portions which are parallel to each other.

6. The process of claim 3,
wherein the analysis of the surface S1 comprises at least the steps consisting in:
a) selecting a point directly above the surface S1;
b) bringing, at the point selected in step a), the tip of the probe to the distance d; and
c) scanning the surface S1 with the probe from the point selected in step a) by maintaining the tip of the probe at the distance d and measuring a current at the probe during scanning,
wherein the analysis of the surface S1 comprises positioning a scanning electrochemical microscopy probe at several points directly above the surface S1 for obtaining such n1 current values, and
wherein a tip of the probe is located at a constant distance d from the surface S1 at each positioning point.

7. The process of claim 6, wherein the positioning points are randomly selected.

8. The process of claim 6, wherein the analysis of the surface S1 comprises at least the steps consisting in:
a) selecting the probe positioning points; and
b) bringing, for each positioning point, the tip of the probe to the distance d and measuring a current at the probe at each positioning point.

9. The process of claim 1, which comprises an use of an electrolyte comprising a redox mediator in the reduced state.

10. The process of claim 9, wherein the redox mediator is ferrocyanide, ferrocene, decamethylferrocene or ferrocene dimethanol.

* * * * *